(12) United States Patent
Macciocca

(10) Patent No.: US 7,376,768 B1
(45) Date of Patent: May 20, 2008

(54) DYNAMIC MEMORY ALLOCATION FOR MULTIPLE TARGETS

(75) Inventor: Gianluca Macciocca, San Francisco, CA (US)

(73) Assignee: Sonic Solutions, Inc., Santa Clara, CA (US)

( * ) Notice: Subject to any disclaimer, the term of this patent is extended or adjusted under 35 U.S.C. 154(b) by 205 days.

(21) Appl. No.: 10/741,093

(22) Filed: Dec. 19, 2003

(51) Int. Cl.
*G06F 3/00* (2006.01)

(52) U.S. Cl. .............................. 710/56; 710/24; 710/52

(58) Field of Classification Search ................... 710/56, 710/52
See application file for complete search history.

(56) References Cited

U.S. PATENT DOCUMENTS

| | | | | |
|---|---|---|---|---|
| 5,867,734 A | * | 2/1999 | Drews .......................... | 710/52 |
| 6,681,384 B1 | * | 1/2004 | Bates et al. .................. | 717/129 |
| 6,850,947 B1 | * | 2/2005 | Chung et al. ................ | 707/101 |
| 2006/0069793 A1 | * | 3/2006 | Li et al. ....................... | 709/231 |

* cited by examiner

Primary Examiner—Niketa Patel
(74) Attorney, Agent, or Firm—Martine Penilla & Gencarella, LLP

(57) ABSTRACT

A method for writing to multiple recording devices where at least two of the multiple recording devices are configured to respond dissimilarly to a command associated with the writing is provided. The method initiates with establishing a plurality of independent write threads configured to read data from a circular buffer composed of an initial amount of buffer elements. Then, each one of the plurality of independent write threads are associated with one of the multiple recording devices. Next, detection of when a write thread associated with a fastest one of the multiple recording devices is reading a last available buffer element occurs. In response to this detection the method includes adding at least one additional buffer element to the circular buffer. A computer readable medium and a system configured to write to multiple recording devices simultaneously are also provided.

9 Claims, 8 Drawing Sheets

DYNAMIC MEMORY ALLOCATION FOR MULTIPLE TARGETS

CROSS REFERENCE TO RELATED APPLICATIONS

This application is related to U.S. patent application Ser. No. 10/741,928 now abandoned, filed on the same day as the instant application and entitled "METHOD AND APPARATUS FOR WRITING TO MULTIPLE DEVICES SIMULTANEOUSLY." This application is hereby incorporated by reference in its entirety for all purposes.

BACKGROUND OF THE INVENTION

1. Field of the Invention

This invention relates generally to methods and apparatus for recording data. More particularly, the invention relates to a method and apparatus for enabling the simultaneous writing of data to multiple devices through corresponding write threads, where the write threads are independent of each other in order to accommodate the varying characteristics of the multiple devices.

2. Description of the Related Art

Traditionally, users have been limited in the ability to write data stored on a local drive of a computing device to another recording device. For example, if a user wants to burn multiple compact discs (CDs), then the user must burn one disc at a time in the recording device. As one can imagine, this process discourages users from even attempting to create a large number of CDs. A further complicating factor is that when multiple recording devices are installed, the recording devices may have different characteristics, e.g., be different brands, or even use different interface technologies, such as, integrated drive electronics (IDE), small computer system interface (SCSI), universal serial bus (USB), etc. It should be appreciated that it is not a viable alternative to have all of the same types of recording devices due to the reason that over time certain device types are discontinued or replaced. For example, where a user wants to add a device to a pre-existing computer having an integrated recorder, the user will typically base their purchase decision on the cost and availability rather than the brand. Thus, the different characteristics, as well as the different interface technologies have thus far been an insurmountable obstacle in establishing the widespread acceptance of the recording of multiple CD's simultaneously.

Yet another shortcoming when copying data to an optical storage medium occurs when the software is not able to provide data as fast as the recording device can write the data. This situation may cause a buffer under-run and result in the laser of the recording device to shut off. In some cases, a drive may accommodate the turning on and off of the laser, however, the disc produced by this process may be non-standard due to the stopping and starting of the laser during the recording process.

As a result, there is a need to solve the problems of the prior art to provide for a method for recording multiple CD's simultaneously, irrespective of the type of recording device or interface and to perform the recording in a manner that substantially eliminates buffer under-run conditions.

SUMMARY OF THE INVENTION

Broadly speaking, the present invention fills these needs by providing a method and computer readable medium capable of writing to multiple devices simultaneously, while reducing the occurrence of buffer under-runs. It should be appreciated that the present invention can be implemented in numerous ways, including as a process, an apparatus, a system, or a device. Several inventive embodiments of the present invention are described below.

In one embodiment, a method for simultaneously writing to multiple recording devices is provided. The method initiates with reading data from a data source through a single read thread. Then, a buffer is filled to a threshold level with data from the data source through the single read thread. Next, the buffer is read through a plurality of write threads, where each of the plurality of write threads corresponds to one of the multiple recording devices. Then it is determined if one of the plurality of write threads is reading a last available buffer. If one of the plurality of write threads is reading the last available buffer, then the method includes, increasing an amount of memory allocated to the buffer; adding data to the increased amount of memory; and reading the increased amount of memory through the corresponding write thread.

In another embodiment, a method for writing to multiple recording devices is provided. At least two of the multiple recording devices are configured to respond dissimilarly to a command associated with the writing. The method initiates with establishing a plurality of independent write threads configured to read data from a circular buffer composed of an initial amount of buffer elements. Then, each one of the plurality of independent write threads are associated with one of the multiple recording devices. Next, when a write thread associated with a fastest one of the multiple recording devices is reading a last available buffer element is detected. In response to this detection, the method includes adding at least one additional buffer element to the circular buffer.

In yet another embodiment, a computer readable medium having program instructions for writing to multiple recording devices is provided. At least two of the multiple recording devices are configured to respond dissimilarly to a command associated with the writing. The computer readable medium includes program instructions for establishing a plurality of independent write threads configured to read from a circular buffer composed of an initial amount of buffer elements. Program instructions for associating each one of the plurality of independent writing threads with one of the multiple recording devices are included. Program instructions for detecting when a write thread associated with a fastest one of the multiple recording devices is reading a last available buffer element, and program instructions for adding at least one additional buffer element to the circular buffer in response to detecting when the write thread is reading the last available buffer element are included.

In still yet another embodiment, a system configured to write to multiple recording devices is provided. The system includes a computing device having a circular buffer. The circular buffer has an initial size configured to store data into a plurality of buffer segments through a read thread. Multiple recording devices in communication with the computing device are provided. A plurality of write threads, where each one of the plurality of write threads are associated with one of the multiple recording devices, are included. The plurality of write threads are configured to read data from the plurality of buffer segments. The system is further configured to recognize when a fastest one of the multiple drives is reading a last available one of the plurality of buffer segments in order to increase the initial size of the circular buffer to provide additional available buffer segments.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method enabling the simultaneous recording through multiple local recording devices while minimizing the possibility of a buffer under-run. It will be obvious, however, to one skilled in the art, that the present invention may be practiced without some or all of these specific details. In other instances, well known process operations have not been described in detail in order not to unnecessarily obscure the present invention.

The embodiments of the present invention provide an apparatus and method for enabling a computing device, e.g., a general purpose computer, to record to multiple recording devices having a common write speed at the same time, irrespective of the interface connection between the computing device and the recording devices or the type of recording device. Furthermore, the embodiments described herein provide for a dynamic circular buffer from which each of the recording devices access the data to be subsequently recorded onto a storage medium. The dynamic circular buffer is a list of buffers, referred to as buffer elements. The size of the dynamic circular buffer may be increased in situations described in more detail below, thereby generating additional buffer elements to prevent a buffer under-run situation.

Figure 1:
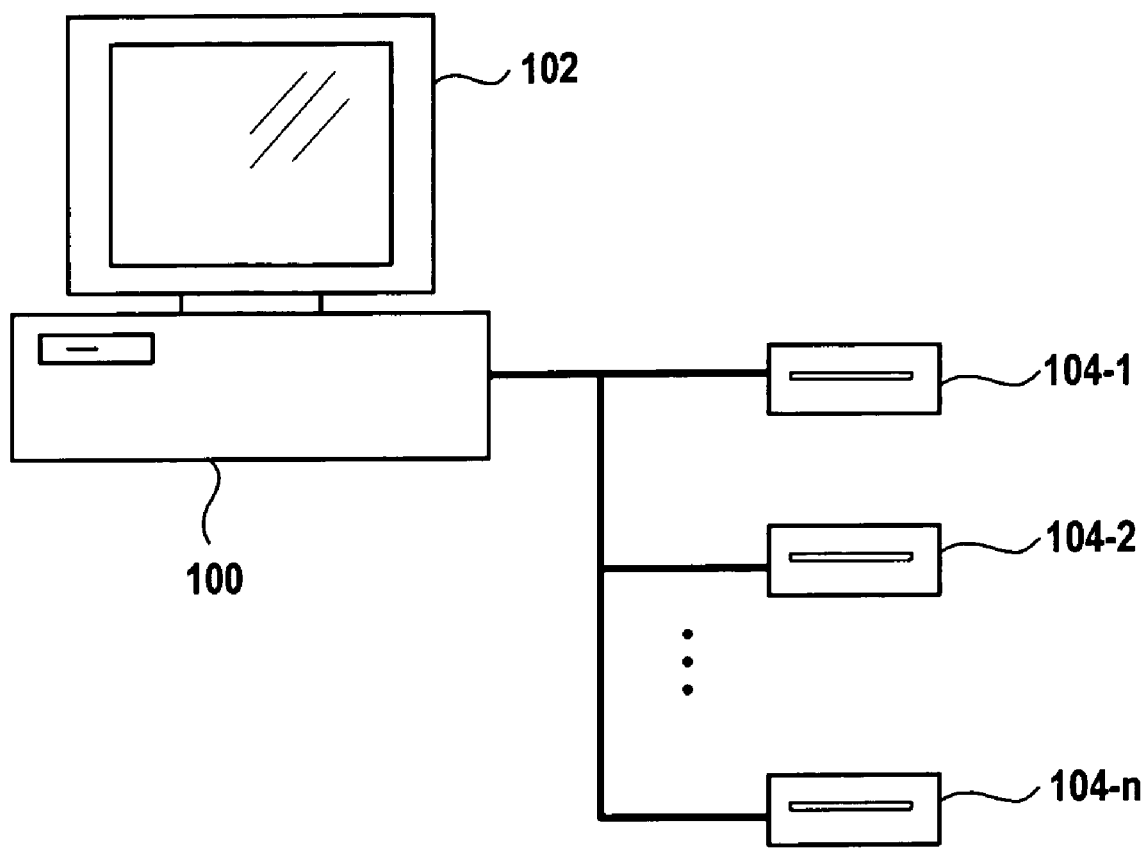
FIG. 1 is a high-level simplified schematic diagram of a computing device configured to simultaneously write data to multiple recording devices in accordance with one embodiment of the invention.

FIG. 1 is a high-level simplified schematic diagram of a computing device configured to simultaneously write data to multiple recording devices in accordance with one embodiment of the invention. Here, general purpose computer 100, which includes display monitor 102, is in communication with recording devices 104-1 through 104-n. In one embodiment, at least two of recording devices 104-1 through 104-n are different. That is, the brand, the model, the interface connection, or some other suitable difference exists between at least two of the recording devices. For example, recording device 104-1 may interface with general purpose computer 100 through a small computer system interface (SCSI), while recording device 104-2 interfaces with general purpose computer 100 through a universal serial bus (USB) interface. It should be appreciated that other suitable interface standards may be used for communication between general purpose computer 100 and recording devices 104-1 through 104-n, such as, integrated drive electronic (IDE) and enhanced integrated drive electronic (EIDE) interfaces. In addition, at least two of the recording devices 104-1 through 104-n may be different brands. For example, recording device 104-1 may be a SONY brand recording device while recording device 104-2 may be a PLEXOR brand recording device. Of course, there are numerous other brands of recording devices available and the invention is not limited to these brands.

Consequently, as a result of the differences between recording devices 104-1 through 104-n, or the associated interface standards, the same command being sent to each drive results in the different recording devices reacting to the commands differently. Thus, one of the drives may take longer to respond to a command. Additionally, one of the different recording devices may not recognize the command, while the other device does recognize the command. Therefore, the devices involved in the recording of the data from general computing device 100 may not be identical, i.e., the recording devices are not from the same manufacturer, same model or have the same firmware revision. As will be explained in more detail below, these differences are accommodated through separate execution threads, referred to as write threads, created for each recording device. Each write thread takes care of sending appropriate commands to a corresponding device, independently. This enables the thread to treat each device according to its manufactures specifications, without interfering with other devices involved in the write operation.

Figure 2:
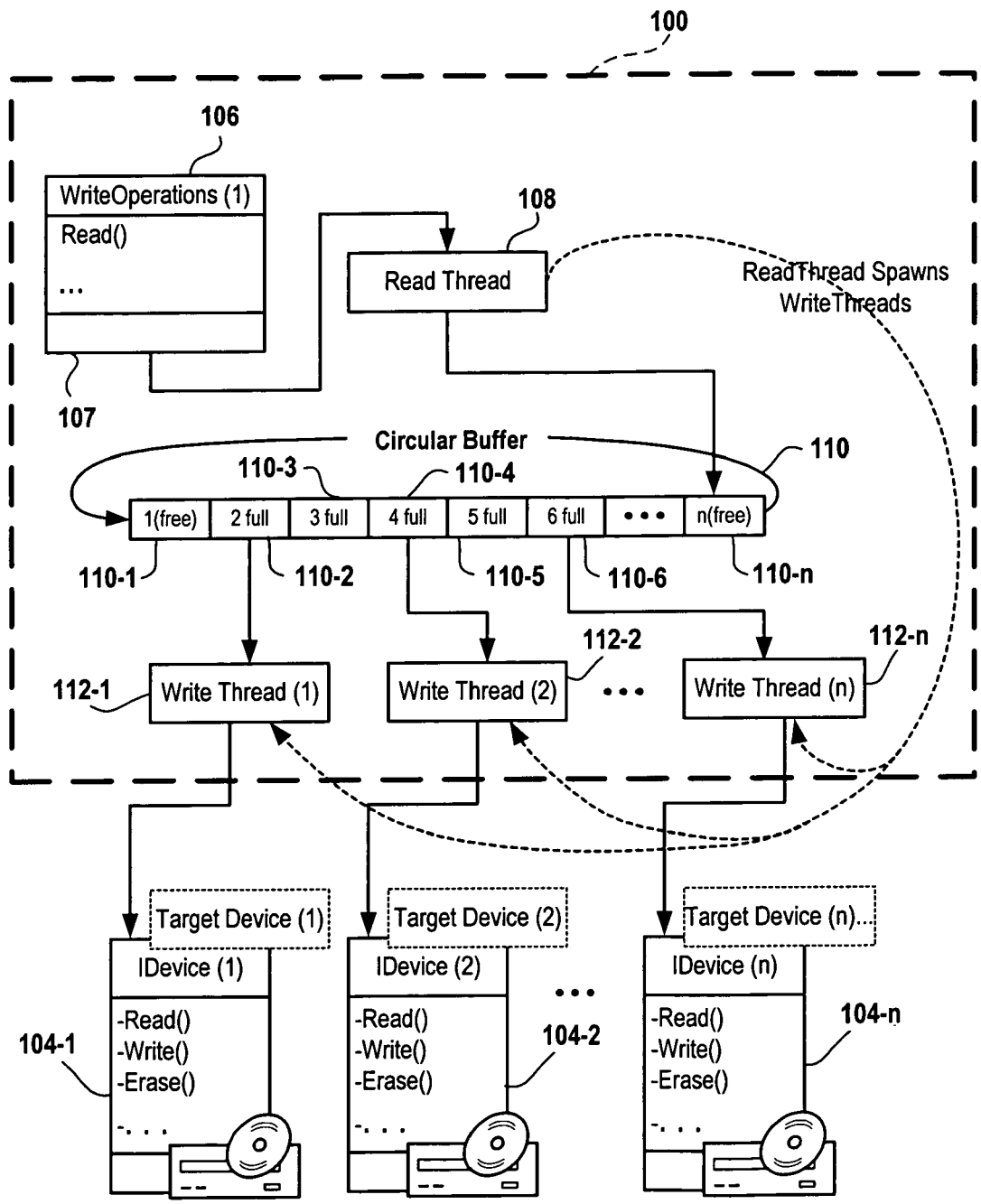
FIG. 2 is a simplified schematic diagram illustrating a computing device having a burning engine capable of writing to multiple recording devices simultaneously in accordance with one embodiment of the invention.

FIG. 2 is a simplified schematic diagram illustrating a computing device having a burning engine capable of writing to multiple recording devices simultaneously in accordance with one embodiment of the invention. Computing device 100 includes data source 106, which stores data to be recorded by recording devices 104-1 through 104-n. Here, write operation (1) defines the action or operation to be performed, which in this case is a read from another disc device. The write operations are then collected by write object module 107. It should be appreciated that the client uses the write module to specify the desired write operations. Besides the read operation illustrated in FIG. 2, other operations, or actions to be performed, may include close session, erase, format, etc., so that the client can compile a list of operations to be performed during the recording process. Additionally, as used herein, a write operation may refer to writing a sequence of blocks, which may be a track of data or a portion of a track of data. Read thread 108 is configured to fill free elements of circular buffer ring 110. Circular buffer ring 110 is composed of a number of buffer elements 110-1 through 110-n. Thus, read thread 108 populates the circular buffer and its corresponding buffer elements with data to be copied. In addition, read thread 108 causes the generation of write threads 112-1 through 112-n, which correspond to recording devices 104-1 through 104-n, respectively.

As shown in FIG. 2, a single write thread is associated with a single recording device. Thus, for three recording devices, three write threads are created. Write threads 112-1 through 112-n are configured to pilot the associated recording devices in order to deliver the data to be copied to the recording device. Write threads 112-1 through 112-n are further configured to write data to a buffer of the corresponding recording device. In one embodiment, write threads 112-1 through 112-n use device objects to perform the writing operation. Recording devices 104-1 through 104-n are configured to copy the data which is written to the buffer of the recording device onto a computer readable storage medium, e.g., a compact disc (CD), digital versatile disc (DVD) or some other suitable recording medium. In one embodiment, each of the recording devices share a common write speed. In another embodiment, each of the recording devices 104-1 through 104-n support a common feature, e.g., disc at once, track at once features.

Still referring to FIG. 2, each of write threads 112-1 through 112-n are reading different elements of the circular buffer 110. It should be appreciated that even with a common write speed for each of recording devices 104-1 through 104-n, does not guarantee that the write threads will proceed through circular buffer 110 at the same rate. With respect to recording devices with different firmware or firmware revisions, commands received by the recording devices will take different amounts of time to process. For example, when starting a recording session, some recording devices take more time to initialize, i.e., the drives have to power a laser, or perform a calibration. Thus, some recording devices may take up to ten seconds prior to initialization of the writing operations, where other recording devices may be more instantaneous. One skilled in the art will appreciate that having independent write threads 112-1 through 112-n, the specific characteristics associated with the different recording devices may all be accommodated. That is, the independent write threads enable the customization of a write thread for the characteristics and specific commands needed by a target recording device.

Read thread 108 of FIG. 2, spawns write threads 112-1 through 112-n. In one embodiment, read thread 108 builds circular buffer 110 up to a pre-defined limit and then initiates the recording through the creation of the multiple independent right threads for each recording device. In one embodiment, circular buffer 110 has a size of 10 megabytes (MB), where each buffer element has a size of 64 Kilobytes (KB). It should be appreciated that these sizes are for exemplary purposes only and not meant to be limiting as a circular buffer and the buffer elements may have any suitable size. In another embodiment, the circular buffer size is at least the size of the largest internal buffer of any of the multiple recording devices 104-1 through 104-n. As each of the multiple recording devices may be different, each recording device may include an internal hardware buffer of different sizes. For example, the internal hardware buffer for recording device 104-1 may be one megabyte while the internal hardware buffer for device 104-2 may be 2 megabytes, and the internal hardware buffer for device 104-n is 8 megabytes in size. Thus, recording device 104-n is capable of initially grabbing more data as compared to recording device 104-2 and 104-1. Therefore, after grabbing the initial information, write thread n 112-n is ready to read from a farther downstream buffer element within circular buffer 110 relative to write thread 2 112-2 and write thread 1 112-1.

Figure 3:
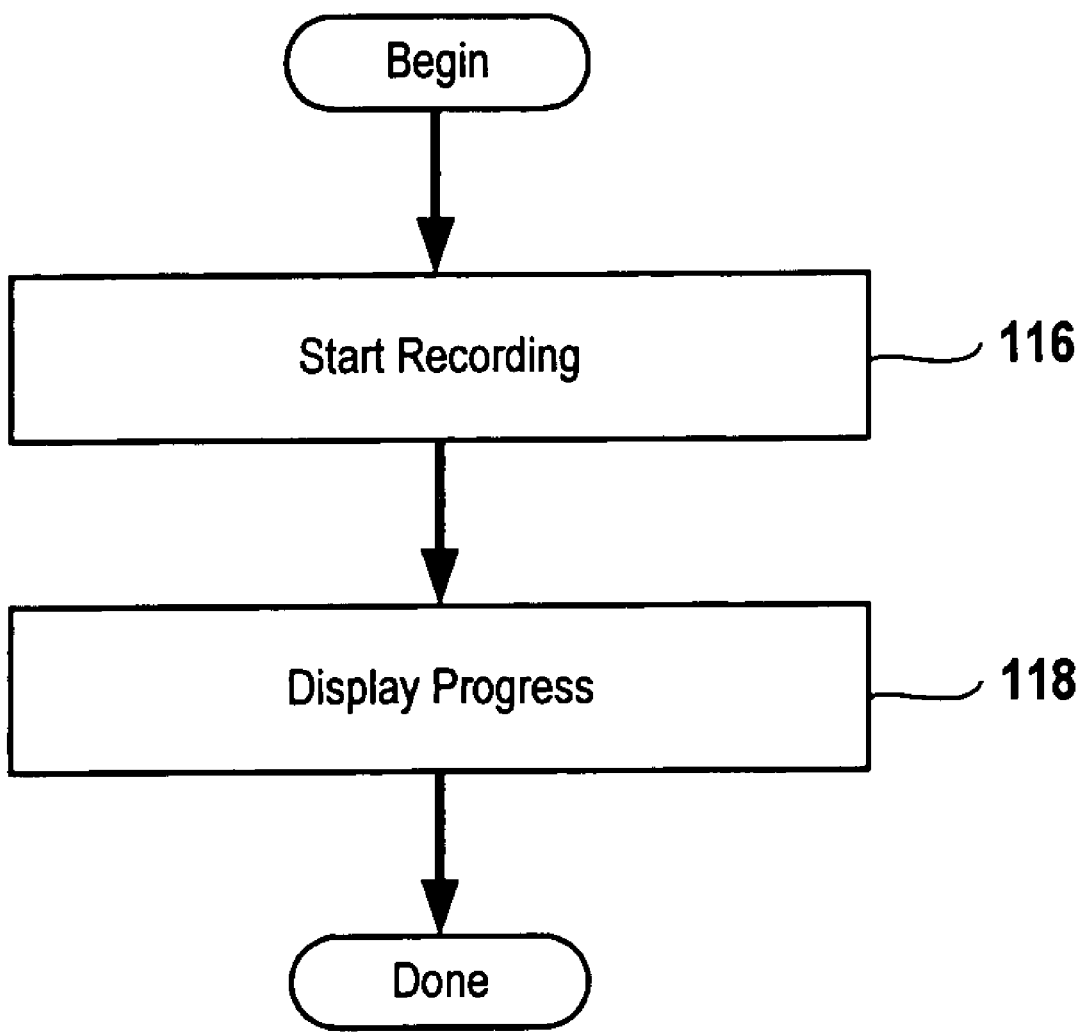
FIG. 3 is a flow chart diagram illustrating the high level operations on a main thread of a client configured to simultaneously write data to multiple recording devices in accordance with one embodiment of the invention.

FIG. 3 is a flow chart diagram illustrating the high level operations on a main thread of a client configured to simultaneously write data to multiple recording devices in accordance with one embodiment of the invention. The method initiates with operation 116 where recording is started. For example, a write operation may define the action to be performed as described above with reference to FIG. 2. The method then moves to operation 118 where the progress of the recording is displayed. Here, the progress may be displayed on a graphical user interface of the client which illustrates the progress associate with the various recording devices in the recording operation. It will be apparent to one skilled in the art that the display of the progress may be in presented any suitable means to the user through a graphical user interface. For example, a user interface displayed on a display screen associated with a client may indicate the display progress through a progress bar presented on a display screen associated with the computing device. In another embodiment, multiple progress bars (one for each recording device) may be provided to indicate the recording progress for each recording device.

Figure 4:
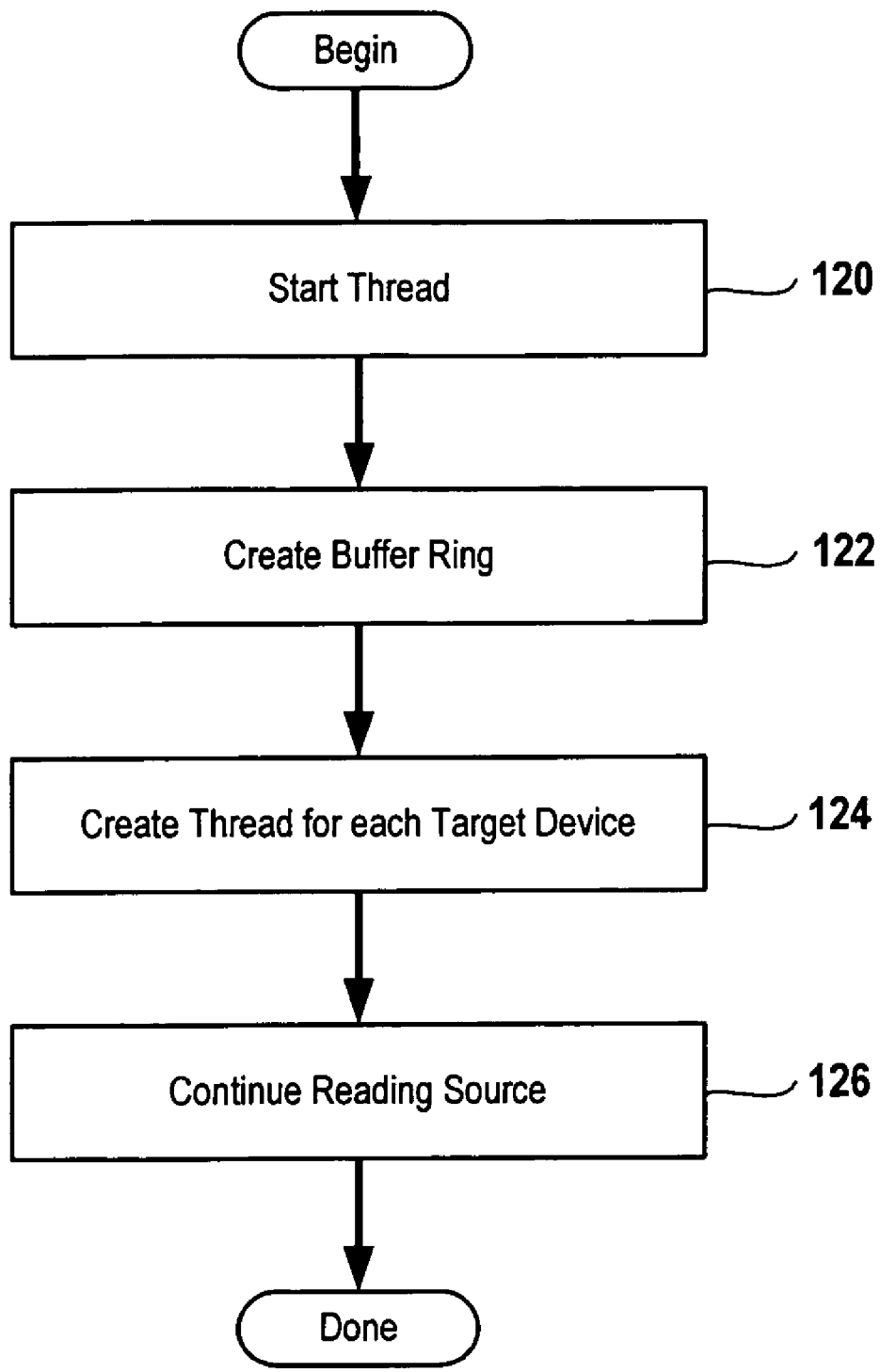
FIG. 4 is a flow chart diagram illustrating the method operations performed by read thread in accordance with one embodiment of the invention.

FIG. 4 is a flow chart diagram illustrating the method operations performed by read thread in accordance with one embodiment of the invention. The method initiates with operation 120 where the read thread is started. Then, in operation 122 the read thread creates a buffer ring. Here, the read thread reads data from a source and deposits that data in available buffer elements of a circular buffer ring. The method then advances to operation 124 where a write thread is created for each target device. As mentioned above, the read thread spawns write threads, such that one write thread is associated with one of the target recording devices. The method then advances to operation 126 where the read thread continues reading the source of the data to be copied. As discussed above, the read thread continues to fill available elements within the circular buffer. In one embodiment, the available buffer elements are identified to the read thread through a counter associated with a circular buffer. Thus, as each write thread accesses an element of the circular buffer, a counter associated with that element is decremented, thereby indicating whether each of the write threads has accessed the corresponding element. That is, when the counter reads zero, each of the write threads has accessed the corresponding buffer element and is an indication that the buffer element is available for more data to replace the accessed data.

Figure 5:
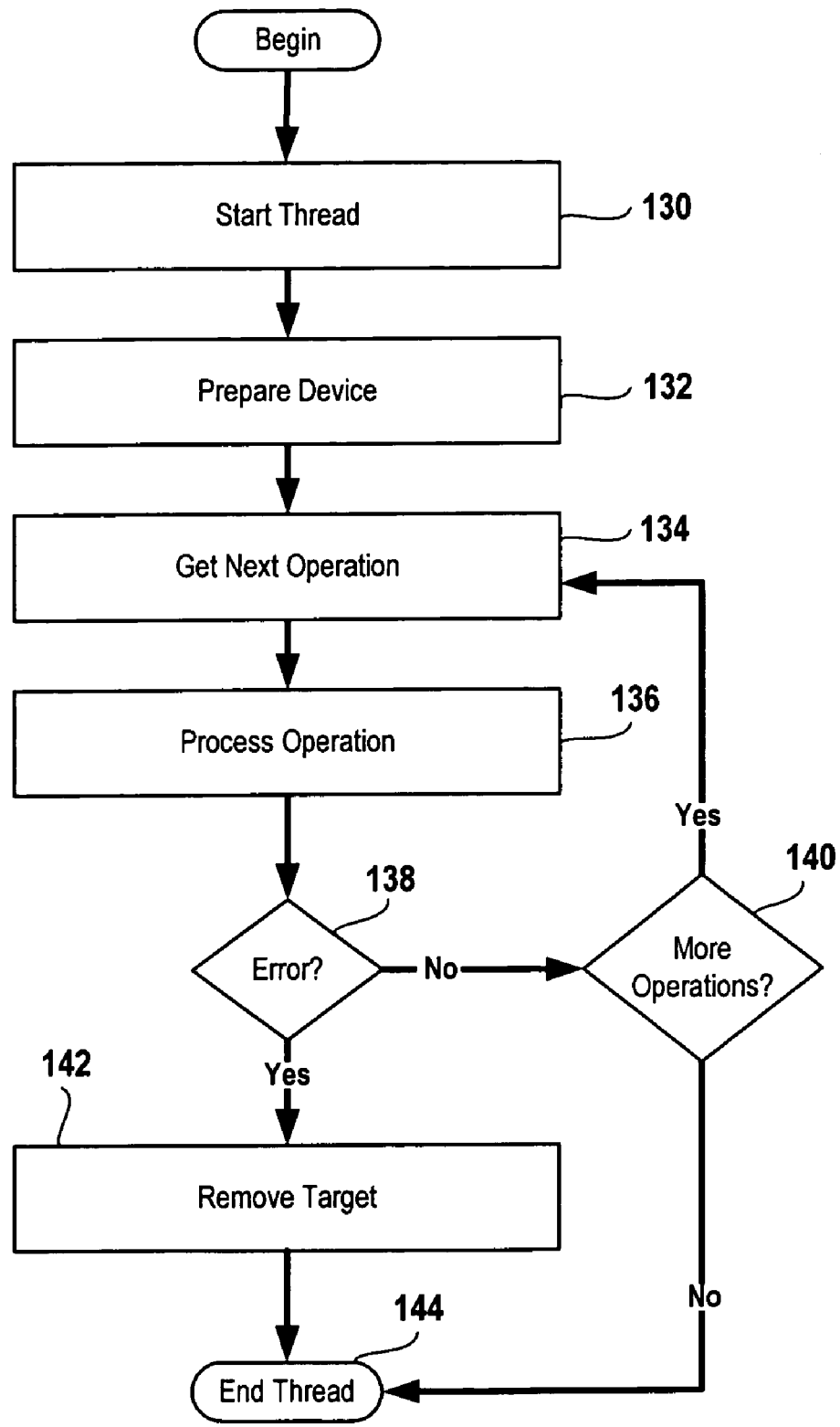
FIG. 5 is a flow chart diagram illustrating the method operations associated with a write thread in accordance with one embodiment of the invention.

FIG. 5 is a flow chart diagram illustrating the method operations associated with a write thread in accordance with one embodiment of the invention. It should be appreciated that each write thread is independent from each other write thread. Therefore, each target device could be at different steps of the recording process. The method initiates with operation 130 where the write thread is initialized. The method then advances to operation 132 where the recording device is prepared for the upcoming write operation. For example, the device may be prepared by defining what and how the recording will take place. Thus, writing/recording speeds may be set here, along with any other suitable recording parameters, such as use of a disc at once technique or track at once technique. The method then proceeds to operation 134 where the next operation is obtained. The next operation may be another write operation, a read operation, or any previously mentioned operation. The method then moves to operation 136 where the operation obtained in step 134 is processed. The method then advances to decision operation 138 where it is determined if an error has occurred. If an error has occurred, the target device associated with the error is removed as a target recording device in operation 142. The thread then terminates in operation 144. If an error has not occurred the method advances from decision operation 138 to decision operation 140. In decision operation 140, it is determined whether more operations are to be performed. If there are more operations to be performed, the method then returns to operation 134 and proceeds as discussed above. If there are no more operations to be performed, the method advances to operation 144 where the thread terminates.

Figure 6:
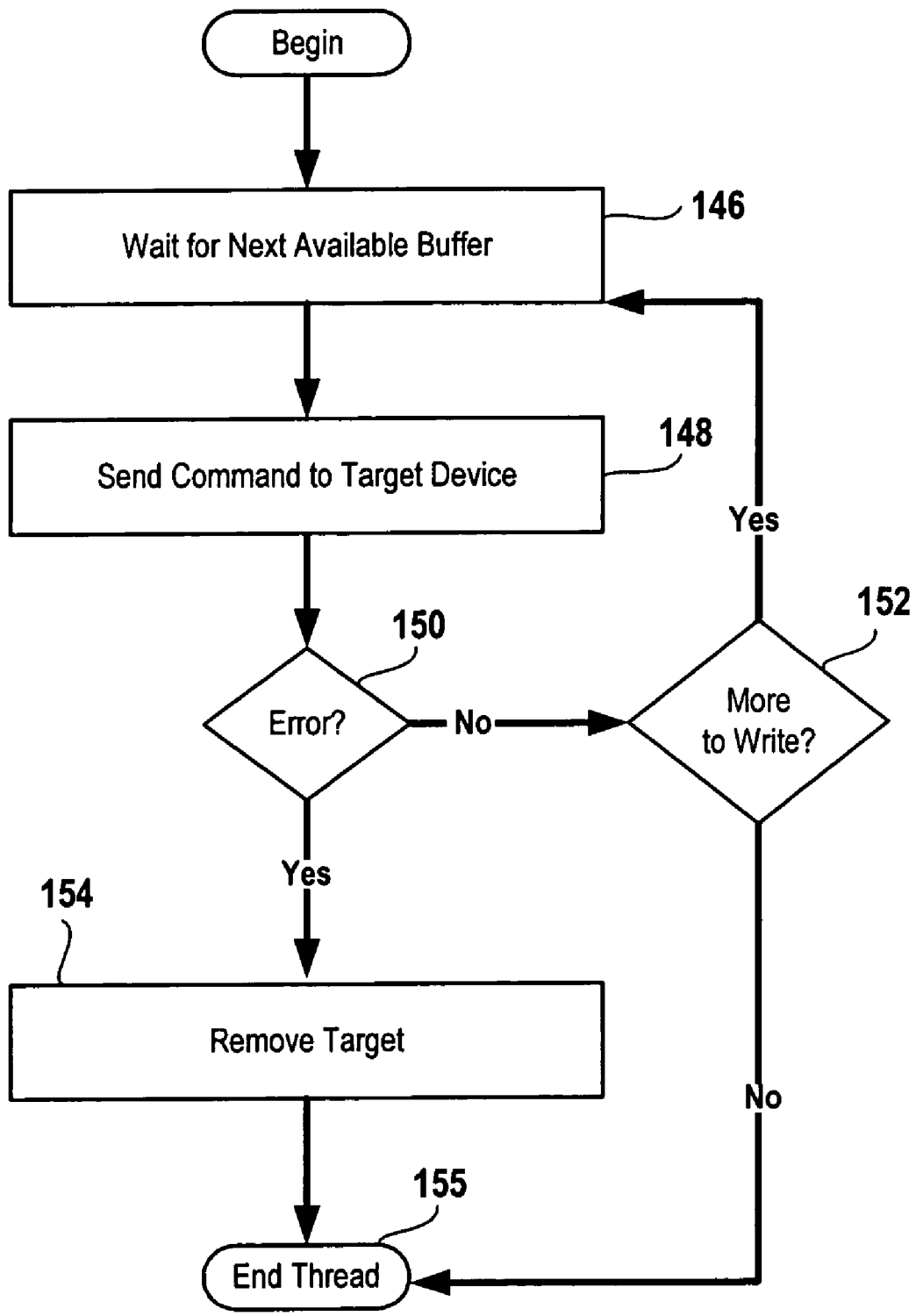
FIG. 6 is a flow chart diagram illustrating the method operations associated with an exemplary write operation in accordance with one embodiment of the invention.

FIG. 6 is a flow chart diagram illustrating the method operations associated with an exemplary write operation in accordance with one embodiment of the invention. Here, the method initiates with operation 146 where the write thread waits for the next available buffer element. Once a buffer element is available, the method advances to operation 148 where a command is sent to the target device through the write thread. Since each of the write threads are independent, it should be appreciated that the write thread may be customized for the particular target device. The method then moves to decision operation 150 where it is determined if an error has occurred. If an error has occurred, the target device associated with the error and the write thread is removed in operation 154. The thread then terminates in operation 155. If an error has not occurred in decision operation 150, then the method proceeds to decision operation 152 where it is determined if there is more data to write. If there is more data to write in operation 152, then the method returns to operation 146 and repeats as described above. If there is no more data to write in decision operation 152, then the thread terminates in operation 155.

Figure 7:
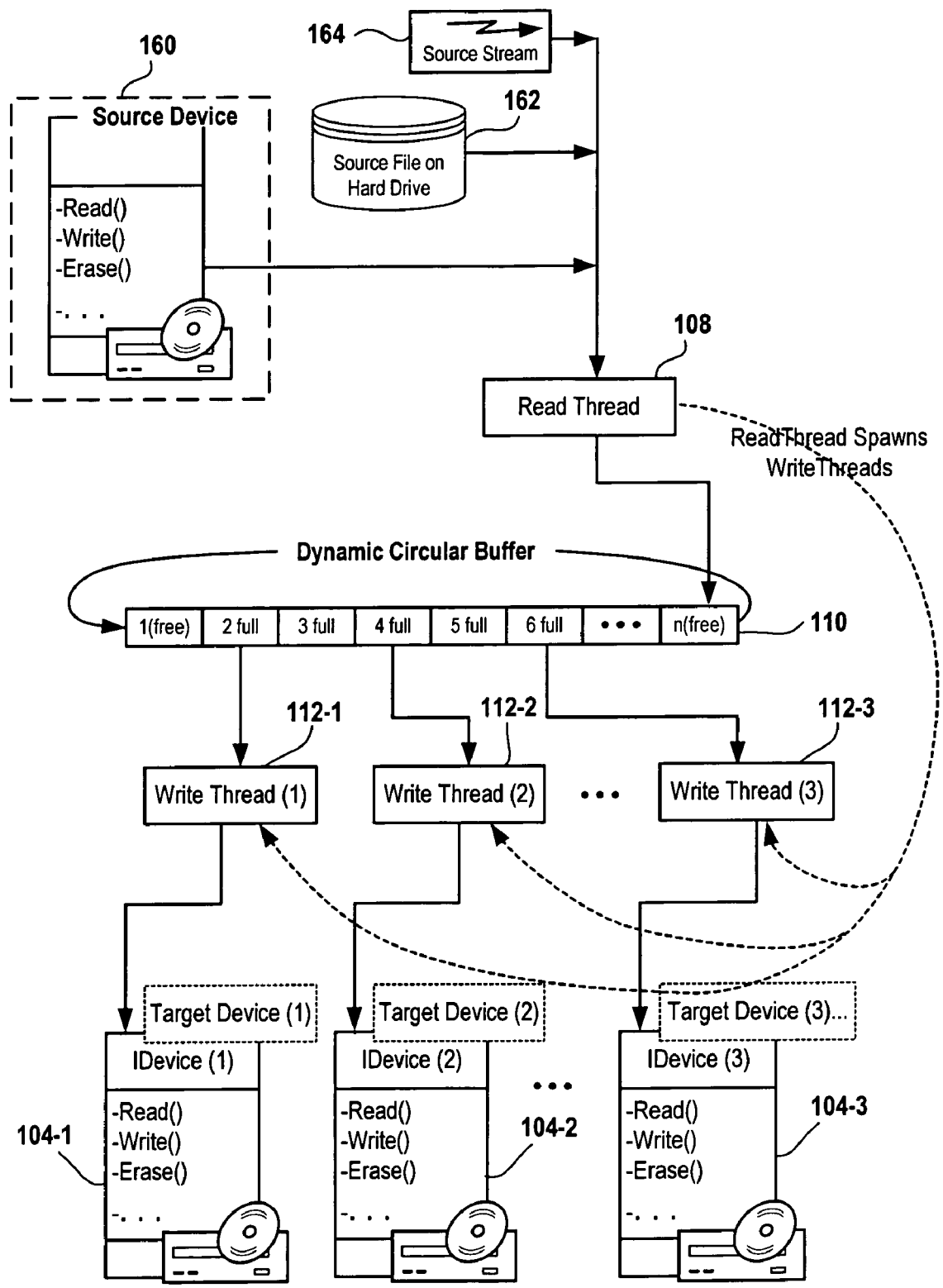
FIG. 7 is a simplified schematic diagram of a system capable of writing to multiple recording devices simultaneously wherein the system includes a dynamic circular buffer configured to prevent buffer under-runs in accordance with one embodiment of the invention.

FIG. 7 is a simplified schematic diagram of a system capable of writing to multiple recording devices simultaneously wherein the system includes a dynamic circular buffer configured to prevent buffer under-runs in accordance with one embodiment of the invention. Here, read thread 108 may obtain data to be copied from any suitable data sources. For example, possible sources include a source stream of data 164, source files on a hard drive 162, and a source device 160, which may include a CD/DVD drive. As discussed above, read thread 108 spawns write threads and fills buffer elements within dynamic circular buffer 110. The dynamic circular buffer is a list of buffers. Each one of these buffers may be either free and ready to be filled by the read thread or full and ready to be read by the write threads in order to be sent to the target recording devices. It should be appreciated that if one of the target recording devices 104-1 through 104-3 is much slower than any of the others and the recording device falls behind, then there will be a smaller number of free buffers in the dynamic circular buffer. This will slow down each device that is reading from the circular buffer. Therefore, when one of the devices falls behind, the dynamic circular buffer 110 is configured to dynamically increase its size to generate additional free buffers, thereby eliminating buffer under-runs which may cause the writing operation to stop.

Still referring to FIG. 7, supposing for illustrative purposes that dynamic circular buffer 110 contains seven buffer elements, i.e., buffer element n is buffer element 7. Thus when write thread (3) 112-3 finishes reading buffer elements six and seven, write thread (3) advances to buffer element one. Buffer element one, which has been previously filled with new data through read thread 108, represents the last available buffer element, assuming that write thread (1) 112-1 is still accessing buffer element two. Thus, once write thread (3) 112-3 finishes reading buffer element one, recording device 104-1 will begin starving for data. While recording device 1 104-1 has an internal buffer that stores data, there is no more data available from the circular buffer to replenish the data of internal buffer as it is accessed. In order to avoid a buffer under-run, the size of dynamic circular buffer 110 is increased, i.e., buffer elements are added to the dynamic circular buffer as described below with reference to FIG. 9. These additional buffer elements are then filled with data and marked as available in order to avoid a buffer under-run situation.

Figure 8:
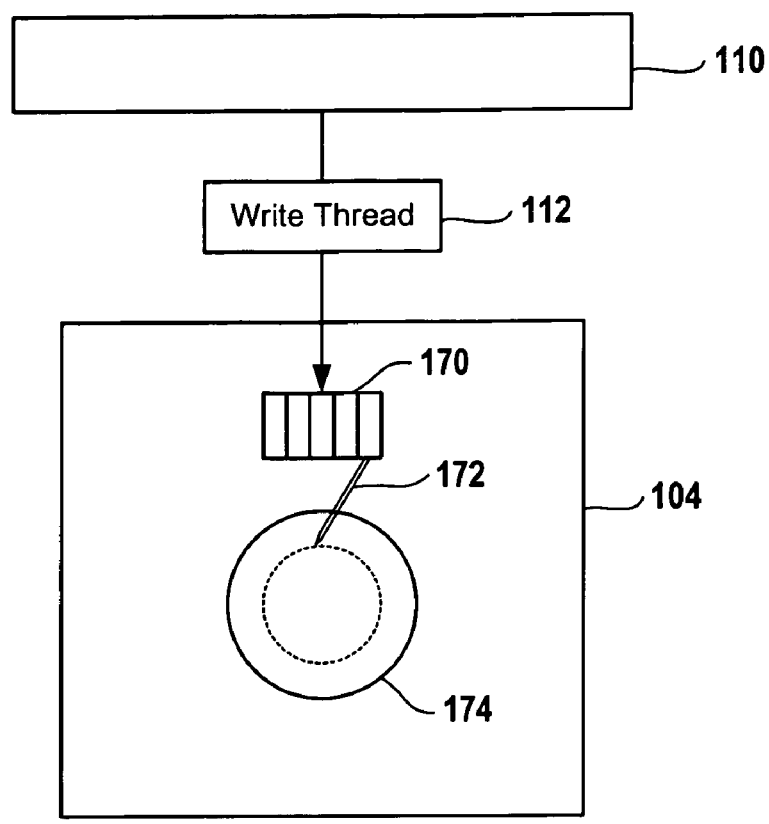
FIG. 8 is a simplified schematic diagram of one of the multiple recording devices in communication with a circular buffer through a write thread in accordance with one embodiment of the invention.

FIG. 8 is a simplified schematic diagram of one of the multiple recording devices in communication with a circular buffer through a write thread in accordance with one embodiment of the invention. Here, dynamic circular buffer 110 includes a plurality of buffer elements which may be increased or decreased depending on the progress of the writing operations. Write thread 112 accesses a buffer element of circular buffer 110 and transfers that data to hardware buffer 170. The data is then copied onto computer readable medium 174 through laser 172 in accordance with generally known practices. It should be appreciated that computer readable medium 174 may be a compact disc. One skilled in the art will appreciate that any suitable computer readable medium may be used to copy the data thereon and the invention is not limited to an optical computer readable medium. As discussed above, hardware buffer 170 of recording device 104 may be variable in size depending on the brand of the recording device. Additionally, the communication interface between circular buffer 110 and recording device 104 may differ among the multiple recording devices. That is, the communication interface may be a SCSI, USB, IDE, EIDE, etc., communication interface. As will be described further below, the size associate with dynamic circular buffer 110, i.e., the number of buffer elements, is adjustable in order to accommodate the differences between the multiple drives performing the recording operations.

Figure 9:
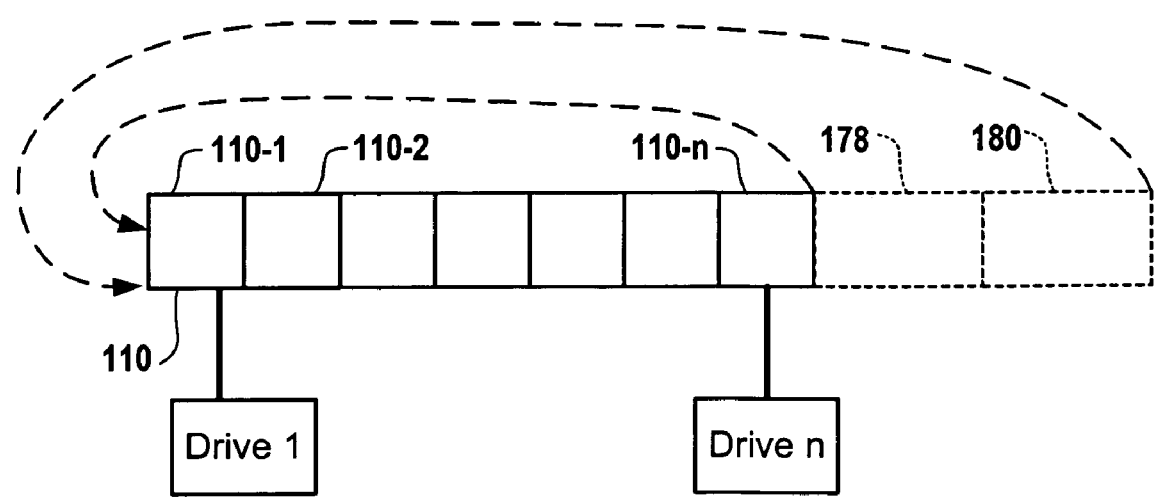
FIG. 9 is a simplified schematic diagram of a dynamic circular buffer capable of being adjusted in accordance with one embodiment of the invention.

FIG. 9 is a simplified schematic diagram of a dynamic circular buffer capable of being adjusted in accordance with one embodiment of the invention. Initially, circular buffer 110 includes buffer elements 110-1 through 110-n. Where a spread between the fastest drive and the slowest drive becomes too great, the dynamic circular buffer may add buffer elements in order to prevent buffer under-runs. For example, where write threads associated with the fastest drive is reading from a last available buffer element due to the wide spread between the write threads, additional buffer elements may be incorporated into the dynamic circular buffer. One skilled in the art will appreciate that detection techniques such as, analyzing a counter related to the last available buffer element may be used here. In one embodiment, the additional buffer elements are incorporated through the allocation of additional memory space. Similarly, should the write threads be reading from a small region of the dynamic circular buffer, i.e., the write threads are bunched within a close section of buffer elements, it may be desirable to reduce the number of buffer elements associated with the dynamic circular buffer. Here, the memory space corresponding to a portion of the buffer elements is allocated for other purposes.

Still referring to FIG. 9, drive 1 is reading buffer element 1 110-1 while drive n is reading buffer element n 110-n. Thus, drive n will not be able to read an additional new buffer element until drive one finishes reading buffer element one, thereby freeing buffer element one for additional data. Consequently, drive n is may starve due to the lack of data, i.e., experience a buffer under-run situation, where drive n copies all of the data in the internal buffer of drive n prior to buffer element 110-1 being available with new data. In order to prevent the buffer under-run, the dynamic circular buffer may add or allocate additional memory space. The additional memory space will have data written to it through the read thread. Thus, additional memory regions 178 and 180, which represent the additional memory space, are allocated to increase the size of circular buffer 110. In one embodiment, each of regions 178 and 180 are 4 MB in size. Therefore, if each of the buffer element sizes is 64 KB in size, a plurality of buffer elements are included in each of regions 178 and 180.

It should be appreciated that the embodiments described herein allow for synchronization between the independent write threads through an event synchronization signal. For example, when writing to a CD rewritable (RW), it may be necessary to erase data on the disc. In this embodiment, the threads will wait until the erase operation is completed, prior to initiating the record session. In another embodiment, the synchronization will be performed at any possible break. Thus, for a track at once copying technique, the threads may synchronize between each track.

In summary, the above described embodiments provide a system and method capable of writing to multiple recording devices simultaneously. The system is capable of accommodating different characteristics of each of the multiple recording devices through independent recording threads, referred to as write threads. Additionally, a dynamic circular buffer is provided to minimize the occurrence of buffer under-runs. The dynamic circular buffer is capable of having a number of buffer elements adjusted in order to prevent buffer under-runs and the unnecessary allocation of memory for the circular buffer. One skilled in the art will appreciate that the embodiments described above may be incorporated into any suitable software. For example, the functionality described above may be incorporated into EASY CD & DVD CREATOR™ software, such as the DISC COPIER application of version 6.x or all applications of version 7.x, owned by the above named assignee.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable storage medium is any data storage device that can store data which can be thereafter be read by a computer system. Examples of the computer readable storage medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. A computer readable transmission medium includes an electromagnetic wave carrier.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for writing to multiple recording devices where at least two of the multiple recording devices are configured to respond dissimilarly to a command associated with the writing, comprising:
   reading data from a data source through a single read thread;
   filling a circular buffer through the single read thread to a threshold level with data from the data source;
   generating a plurality of independent write threads from the single read thread, the plurality of independent write threads configured to read from the circular buffer;
   associating each one of the plurality of independent write threads with one of the multiple recording devices;
   pausing each of the plurality of independent write threads through a synchronization signal at different buffer elements until an erase operation completes;
   releasing each of the plurality of independent write threads at different points to initiate a writing session upon completion of the erase operation;
   detecting when a write thread associated with a fastest one of the multiple recording devices is reading a last available buffer element; and
   adding at least one additional buffer element to the circular buffer by adjusting an amount of buffer elements in response to the detecting.

2. The method of claim 1, wherein the method operation of adding at least one additional buffer element to the circular buffer includes,
   filling the at least one additional buffer element with data through the single read thread; and
   designating the at least one additional buffer element as available.

3. The method of claim 1, further comprising:
   adding additional data to a buffer element after a slowest one of the multiple recording devices has read from the buffer element.

4. The method of claim 3, wherein the additional data replaces previous data.

5. The method of claim 1 further comprising:
   reducing the current amount of available buffer elements in the circular buffer when the current amount of available buffer elements is greater than a predefined amount; and
   increasing the current amount of available buffer elements in the circular buffer when the current amount of available buffer elements is less than a predefined amount.

6. A computer readable storage medium having program instructions, stored thereon, for writing to multiple recording devices where at least two of the multiple recording devices are configured to respond dissimilarly to a command associated with the writing, comprising:

program instructions for reading data from a data source through a single read thread;

program instructions for filling a circular buffer through the single read thread to a threshold level with data from the data source;

program instructions for generating a plurality of independent write threads from the single read thread the plurality of independent write threads configured to read from the circular buffer;

program instructions for associating each one of the plurality of independent write threads with one of the multiple recording devices;

program instructions for pausing each of the plurality of independent write threads at different buffer elements through a synchronization signal until an erase operation completes;

program instructions for releasing each of the plurality of independent write threads at different points to initiate a writing session upon completion of the erase operation;

program instructions for detecting when a write thread associated with a fastest one of the multiple recording devices is reading a last available buffer element; and program instructions for adding at least one additional buffer element to the circular buffer by adjusting an amount of buffer elements in response to the detecting.

7. The computer readable medium of claim 6, wherein the program instructions for adding at least one additional buffer element to the circular buffer includes, program instructions for filling the at least one additional buffer element with data through the single read thread; and program instructions for designating the at least one additional buffer element as available.

8. The computer readable medium of claim 6, further comprising:

program instructions for adding additional data to a buffer element after a slowest one of the multiple recording devices has read from the buffer element.

9. The computer readable medium of claim 8, wherein the additional data replaces previous data.

* * * * *